Aug. 9, 1966 H. REIK 3,265,848
FLAMEPROOF THERMOSTAT ASSEMBLIES
Filed Dec. 7, 1964

Hanns Reik
INVENTOR

BY Lawrence E. Laubscher
ATTORNEY

United States Patent Office 3,265,848
Patented August 9, 1966

3,265,848
FLAMEPROOF THERMOSTAT ASSEMBLIES
Hanus Reik, London, England, assignor to Isopad Limited
Filed Dec. 7, 1964, Ser. No. 416,268
5 Claims. (Cl. 200—168)

For the control of electric heating equipment, particularly electric surface heating equipment, in areas where concentration of vapours or dust might occur and are thus classed as hazardous, thermostatically controlled switches which are flameproof may be essential. A simple type of thermostat relies on the expansion of a liquid in a control bulb, the bulb being conncted by a capillary tube to a control head, where a pair of contacts are arranged to open and close at different temperatures in dependence upon the expansion and contraction of the liquid. However, it is difficult to arrange for the passage of a capillary tube into a flameproof enclosure, while preserving the flameproof characteristics of that enclosure.

The present invention provides a flameproof thermostat assembly including a flameproof housing containing a thermostat switch, and a capillary tube connected to the switch and sealed in gas-tight manner, in a bush which is removably located in a bore through the wall of the housing, the length of engagement of the bush in the bore, and the gap therebetween being such as to render the joint between the bush and the housing flameproof, and means being provided to prevent fortuitous displacement of the bush from the bore.

One form of flameproof thermostat assembly and some modifications thereof, all in accordance with the invention, are described below, by way of example only, with reference to the accompanying drawings, in which.

Figure 1:
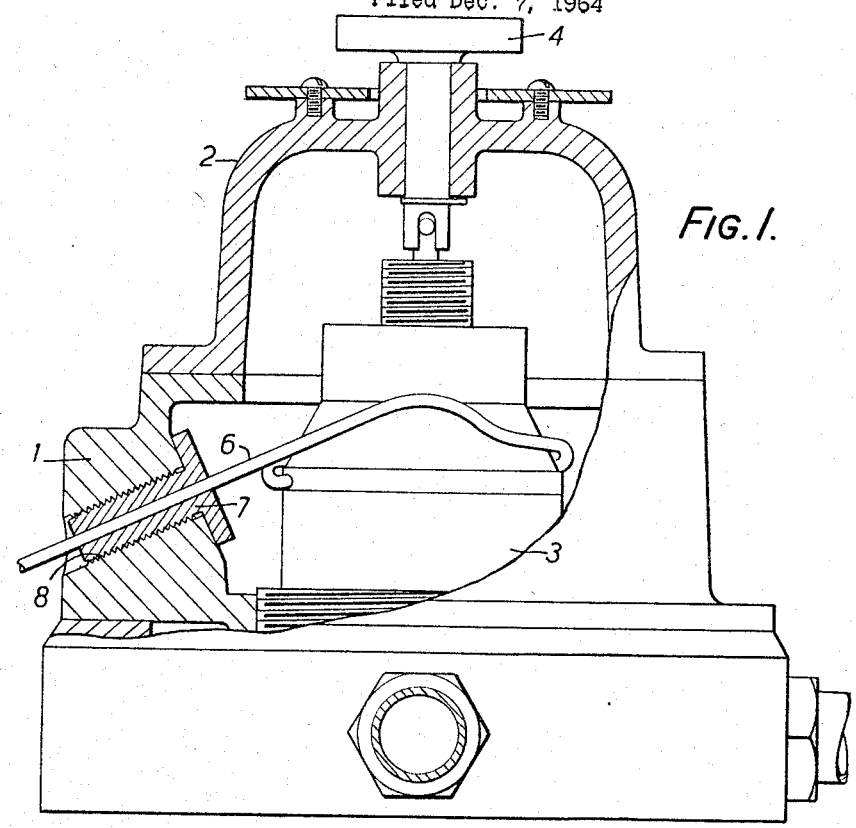
FIGURE 1 is a side view partly broken away and partly in section of the thermostat assembly.

The thermostat assembly shown in FIGURE 1 comprises a flameproof housing made up of a body portion 1 and a cover portion 2, the housing containing a thermostat switch 3 whose setting is varied by means of a manually operated control knob 4. The switch contacts are arranged to be opened and closed at different temperatures in dependence upon the expansion and contraction of a liquid filling a control bulb, not shown, which is permanently connected to the outer end of a capillary tube 6 which is connected at its inner end to the switch.

The tube 6 passes through a threaded bush 7, whose bore is only slightly larger than the outside diameter of the tube 6, and the tube is silver soldered to the bush, making a gas tight joint. The bush 7 is screwed into a bore 8 in the body 1 of the housing, the bush having an enlarged head at its inner end, to prevent the bush from being unscrewed from outside the housing. The effective length of the screw thread of the bush is at least ¾", to comply with flameproof regulations.

Figure 2:
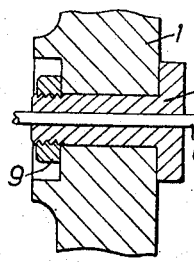
FIGURE 2 is a scrap sectional elevation showing a modification.

In the modification illustrated in FIGURE 2, the bush is not screw-threaded but is made a sliding fit in the bore 8, a lock nut 9 engaging a screw threaded outer end portion of the bush to lock the bush in position, so that it cannot be released accidentally or improperly. The fit of the bush 7 in the bore 8 must be so good that the clearance left between them is less than the gap permitted by flameproof regulations, approximately 0.006 inch.

Figure 3:
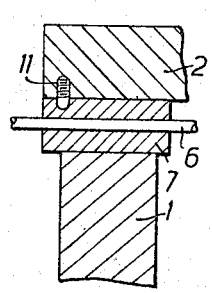
FIGURES 3 and 4 are a scrap sectional elevation and end view of another modification.
Figures 4, 5:
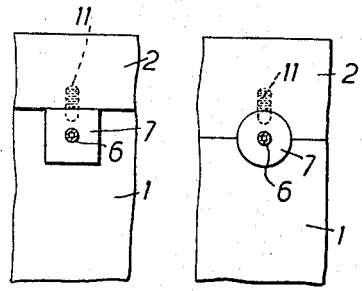
FIGURE 5 is a scrap end view showing a third modification.

In another modification, illustrated in FIGURES 3 and 4, the opening through the wall of the flameproof housing required for the passage of the capillary tube 6 is provided by forming a groove or slot of U or other convenient cross section on that face of the body 1 of the housing which mates with a face on the cover 2. The capillary tube 6 is again fitted at an appropriate position with a bush 7 which is brazed to the tube, the external surface of the bush being machined to fit closely within the slot. The length of the bush and of the slot and the closeness of the fit between them are such that when the housing is assembled round the bush, with the cover 2 fitting closely against the bush, the gap left complies with flameproof requirements. Fortuitous displacement of the bush out of the bore is prevented by means of a grub screw 11 screwed into the cover 2 and projecting into a recess in the bush.

A third modification, illustrated in FIGURE 5, is similar to that shown in FIGURES 3 and 4, except that the groove which receives the bush is not formed wholly in one of the housing parts but by registering grooves in the body and the cover.

I claim:

1. A flameproof thermostat assembly, comprising a flameproof housing, having a wall, a thermostat switch within said housing, means defining a bore through the wall of said housing, a bush removably located in said bore, the length of engagement of said bush in said bore and the gap therebetween being such as to render flameproof the joint between said bush and said housing, means for preventing fortuitous displacement of said bush from said bore, and a capillary tube connected to said switch and extending in sealed, gas-tight relation through said bush.

2. An assembly according to claim 1 wherein said bush has screw threaded engagement in said bore.

3. An assembly according to claim 1 wherein said bush is a sliding fit in said bore said bush having an enlarged head portion at one end, within the housing, and having at its other end a threaded portion which receives a locking nut.

4. An assembly according to claim 1, wherein said housing comprises at least two separate parts having mating faces, one of said parts having means defining a groove in its said mating face, said bush being received in said groove and retained therein by engagement of said mating face of the other of said parts.

5. An assembly according to claim 1, wherein said housing comprises at least two separate parts having mating faces, each said part having a groove in its mating face, said grooves being in register and constituting said bore.

No references cited.

ROBERT K. SCHAEFER, *Primary Examiner.*